US008149541B2

(12) United States Patent
Baumgart et al.

(10) Patent No.: US 8,149,541 B2
(45) Date of Patent: Apr. 3, 2012

(54) SYSTEM FOR CONTROLLING CONTACT LOCATION DURING TFC TOUCHDOWN AND METHODS THEREOF

(75) Inventors: Peter Michael Baumgart, San Jose, CA (US); Jia-Yang Juang, Santa Clara, CA (US); Gurinder Pal Singh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 721 days.

(21) Appl. No.: 12/253,459

(22) Filed: Oct. 17, 2008

(65) Prior Publication Data

US 2010/0097721 A1    Apr. 22, 2010

(51) Int. Cl.
G11B 5/60    (2006.01)

(52) U.S. Cl. ............ 360/235.4; 360/75; 360/234.5; 360/59

(58) Field of Classification Search ............. 360/235.4, 360/59, 75, 234.5, 294.7, 125.3, 125.31, 360/125.71, 125.74
See application file for complete search history.

(56) References Cited

U.S. PATENT DOCUMENTS

| | | | |
|---|---|---|---|
| 5,991,113 A | 11/1999 | Meyer et al. | 360/75 |
| 6,125,008 A | 9/2000 | Berg et al. | 360/106 |
| 6,239,951 B1 | 5/2001 | Wang et al. | 360/236.8 |
| 6,700,724 B2 | 3/2004 | Riddering et al. | 360/69 |
| 6,876,509 B2 | 4/2005 | Bonin et al. | 360/75 |
| 6,888,693 B2 | 5/2005 | Boutaghou et al. | 360/75 |
| 6,947,242 B2 | 9/2005 | Seing et al. | 360/75 |
| 6,958,871 B2 | 10/2005 | Hirano et al. | 360/31 |
| 7,035,061 B2 * | 4/2006 | Singleton et al. | 360/324.12 |
| 7,068,453 B2 * | 6/2006 | Terris et al. | 360/59 |
| 7,119,979 B2 | 10/2006 | Fong et al. | 360/75 |
| 7,153,193 B1 | 12/2006 | Kurita et al. | 451/8 |
| 7,362,535 B2 | 4/2008 | Kumano | 360/75 |
| 7,729,087 B1 * | 6/2010 | Stoev et al. | 360/125.74 |
| 2003/0043491 A1 | 3/2003 | Riddering et al. | 360/69 |
| 2005/0057834 A1 | 3/2005 | Hirano et al. | 360/31 |
| 2007/0109679 A1 | 5/2007 | Han et al. | 360/75 |
| 2007/0230018 A1 | 10/2007 | Schreck et al. | 360/75 |
| 2008/0100966 A1 | 5/2008 | Ozeki | 360/235.4 |

FOREIGN PATENT DOCUMENTS

CN    1719522 A    1/2006

* cited by examiner

Primary Examiner — David Lam
(74) Attorney, Agent, or Firm — Zilka-Kotab, PC (57) ABSTRACT

A system according to one embodiment includes a thin film stack having a magnetic transducer and a contact pad; and a heater in the thin film stack for inducing thermal protrusion of a media-facing side of the thin film stack, wherein the thin film stack is characterized by the contact pad protruding farther than the magnetic transducer upon the thin film stack being heated by the heater. A method for calibrating a protrusion of a magnetic head includes increasing a thermal protrusion of a magnetic head to induce head-medium contact; determining that the head has contacted the medium, wherein a portion of the head that contacts the medium is a contact pad or overcoat of the contact pad; determining parameters for inducing a desired amount of protrusion based in part on the determination that the head has contacted the medium; and storing the parameters.

25 Claims, 7 Drawing Sheets

SYSTEM FOR CONTROLLING CONTACT LOCATION DURING TFC TOUCHDOWN AND METHODS THEREOF

FIELD OF THE INVENTION

The present invention relates to data storage systems, and more particularly, this invention relates to controlling the contact location during thermal fly-height control touchdown in magnetic disks.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In typical systems, recession is created after lapping and pre-carbon etching processes. This creates a distance between the transducers and the disk surface. Thermal fly-height control (TFC) is a method of altering this distance between the transducers and the disk surface by heating the components of the reader/writer causing thermal expansion of the materials, which results in the reader/writer transducers protruding closer to the surface of the hard disk. The transducers are moved closer to the disk surface to enable proper reading and writing of the tracks.

To accurately control the head to disk clearance, the power to the TFC heater may be calibrated until head-disk contact is initiated, noting the necessary heating power for contact, and then reducing the power to achieve the desired clearance. Power is supplied to the heater until a portion of the head protrudes and makes contact with the disk. This contact establishes a zero of the spacing. The heat is then reduced until the read sensor retracts from the disk by a pre-determined amount. This spacing change at the reader location can be measured by the change in the readback signal using the Wallace spacing law, as is known to those of ordinary skill in the relevant art. This TFC protrusion calibration may require a series of head-disk contacts either during the manufacture of the disk drive or during disk drive operations. Unfortunately, this conventional method of TFC, which is now commonly used to control the slider disk spacing in head disk drives, does not provide the absolute spacing of the reader from the disk, as the contact location can be away from the reader. This flying height difference between the point of contact and the reader location is a source of uncertainty and should be minimized without making the reader itself the point of contact.

In prior art systems, during TFC induced touchdown, there is a higher probability of contact between the disk and the AlTiC edge or the reader. The AlTiC is much harder than the disk, and therefore damage to the disk overcoat or the disk itself may result from contact and create a risk of disk corrosion or defective sites that may cause a crash or loss of data. Also, contact between the reader or writer pole-tip and the hard disk can damage the reader/writer and cause performance issues due to magnetostriction or may cause the device to malfunction or operate erratically. Similarly, contact with the reader/writer may cause the carbon overcoat to wear off, possibly leading to corrosion of the head. Therefore, a method of determining when the pole-tip is in proper position without risking damage to useful portions of the hard disk drive or magnetic head is desired.

SUMMARY OF THE INVENTION

A system according to one embodiment includes a thin film stack having a magnetic transducer and a contact pad; and a heater in the thin film stack for inducing thermal protrusion of a media-facing side of the thin film stack, wherein the thin film stack is characterized by the contact pad protruding farther than the magnetic transducer upon the thin film stack being heated by the heater.

A system according to another embodiment includes a thin film stack having a sensor, a writer, and a contact pad positioned between the sensor and the writer; and a heater in the thin film stack for inducing thermal protrusion of a media-facing side of the thin film stack, wherein the thin film stack is characterized by the contact pad protruding farther than the magnetic transducer upon the thin film stack being heated by the heater, wherein the heater is positioned behind the contact pad relative to the media-facing side of the thin film stack.

A method for calibrating a protrusion of a magnetic head includes increasing a thermal protrusion of a magnetic head to induce head-medium contact; determining that the head has contacted the medium, wherein a portion of the head that contacts the medium is a contact pad or overcoat of the contact pad; determining parameters for inducing a desired amount of protrusion based in part on the determination that the head has contacted the medium; and storing the parameters.

A method for calibrating a protrusion of a magnetic head includes increasing a thermal protrusion of a magnetic head to induce head-medium contact; determining that the head has contacted the medium, wherein a portion of the head that contacts the medium is a contact pad or overcoat of the contact pad; and reducing the thermal protrusion by a predetermined amount upon determining that the head has contacted the medium.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2F, is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system comprises a thin film stack having a magnetic transducer and a contact pad; and a heater in the thin film stack for inducing thermal protrusion of a media-facing side of the thin film stack, wherein the thin film stack is characterized by the contact pad protruding farther than the magnetic transducer upon the thin film stack being heated by the heater.

In another general embodiment, a system comprises a thin film stack having a sensor, a writer, and a contact pad positioned between the sensor and the writer; and a heater in the thin film stack for inducing thermal protrusion of a media-facing side of the thin film stack, wherein the thin film stack is characterized by the contact pad protruding farther than the magnetic transducer upon the thin film stack being heated by the heater, wherein the heater is positioned behind the contact pad relative to the media-facing side of the thin film stack.

In still another general embodiment, a method for calibrating a protrusion of a magnetic head comprises increasing a thermal protrusion of a magnetic head to induce head-medium contact; determining that the head has contacted the medium, wherein a portion of the head that contacts the medium is a contact pad or overcoat of the contact pad; determining parameters for inducing a desired amount of protrusion based in part on the determination that the head has contacted the medium; and storing the parameters.

In another general embodiment, a method for calibrating a protrusion of a magnetic head comprises increasing a thermal protrusion of a magnetic head to induce head-medium contact; determining that the head has contacted the medium, wherein a portion of the head that contacts the medium is a contact pad or overcoat of the contact pad; and reducing the thermal protrusion by a predetermined amount upon determining that the head has contacted the medium.

Figure 1:
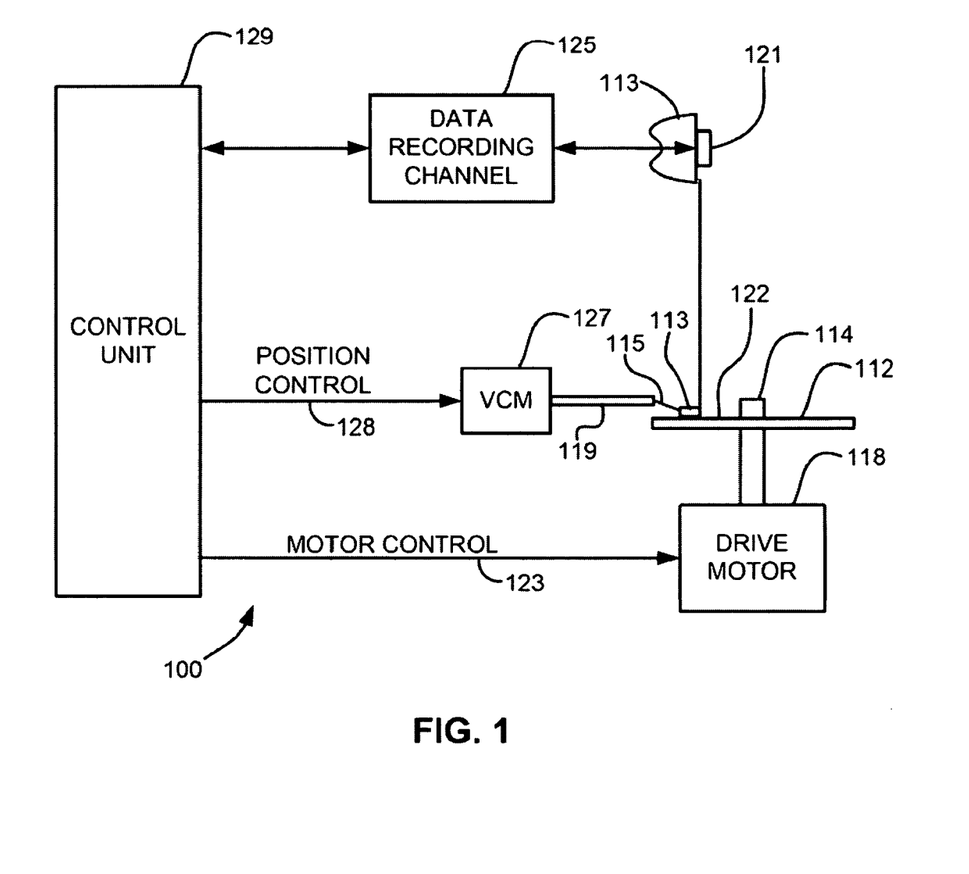
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
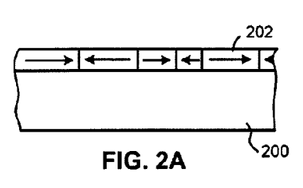
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
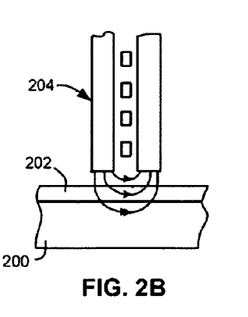
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
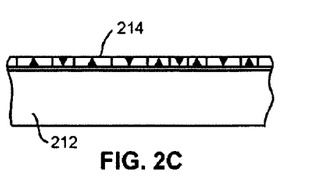
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
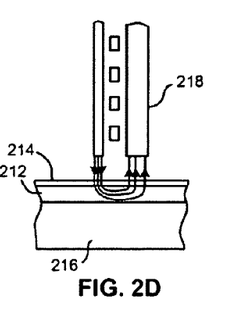
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
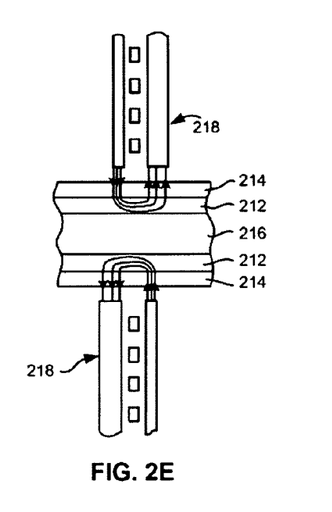

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
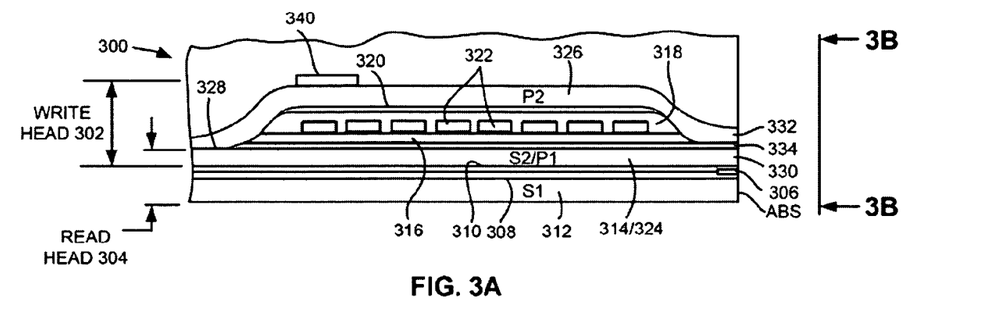
FIG. 3A is a partial view of a merged magnetic head.
Figure 3B:
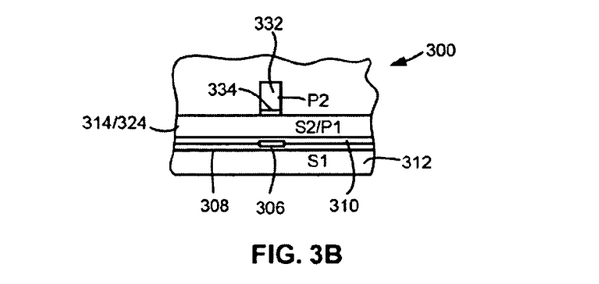
FIG. 3B is a partial ABS view, not to scale, of the slider taken along plane 3B-3B of FIG. 3A.

FIG. 3A is a side cross-sectional elevation view of an illustrative merged magnetic head 300, which includes a write head portion 302 and a read head portion 304, the read head portion 304 employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry, e.g., processing circuitry of the control unit (129, FIG. 1).

The write head portion 302 of the magnetic head 300 includes a coil layer 322 sandwiched between first and second insulation layers 316 and 318. A third insulation layer 320 may be employed for planarizing the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head, an insulation layer is located between a second shield layer and a first pole piece layer. First and second solder connections (not shown) connect leads (not shown) from the spin valve sensor 306 to leads (not shown) on the slider (113, FIG. 1), and third and fourth solder connections (not shown) connect leads (not shown) from the coil 322 to leads (not shown) on the suspension. A heater 340 may be present to induce protrusion, as discussed immediately below. The position of the heater 340 may vary based on design parameters such as where the protrusion is desired, coefficients of thermal expansion of the surrounding layers, etc.

As mentioned above, slider head designs may have a small heater 340 next to the read/write elements. If an electric current is applied to this heater 340, the region around the heater 340 may thermally expand leading to reduced head-disk spacing. This is often referred to as Thermal Fly-height Control (TFC).

Figure 4A:
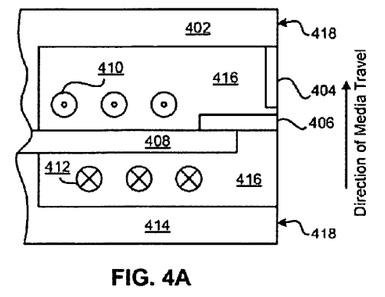
FIG. 4A is a cross-sectional view of one particular embodiment of a perpendicular magnetic head with helical coils.

FIG. 4A is a cross-sectional view of a perpendicular magnetic head. In FIG. 4A, helical coils 410 and 412 are used to create magnetic flux in the stitch pole 408, which then delivers that flux to the main pole 406. Coils 410 indicate coils extending out from the page, while coils 412 indicate coils extending into the page. Stitch pole 408 may be recessed from the ABS 418. Insulation 416 surrounds the coils and may provide support for some of the elements. The direction of the media travel, as indicated by the arrow to the right of the structure, moves the media past the lower return pole 414 first, then past the stitch pole 408, main pole 406, trailing shield 404 which may be connected to the wrap around shield (not shown), and finally past the upper return pole 402. Each of these components may have a portion in contact with the ABS 418. The ABS 418 is indicated across the right side of the structure.

Perpendicular writing is achieved by forcing flux through the stitch pole 408 into the main pole 406 and then to the surface of the disk positioned towards the ABS 418.

Figure 4B:
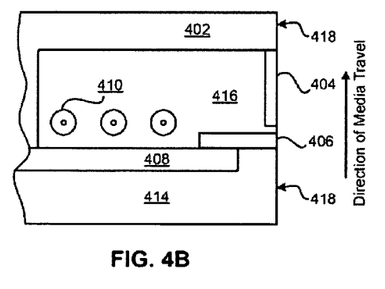
FIG. 4B is a cross-sectional view of one particular embodiment of a perpendicular magnetic head with looped coils.

FIG. 4B is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4C:
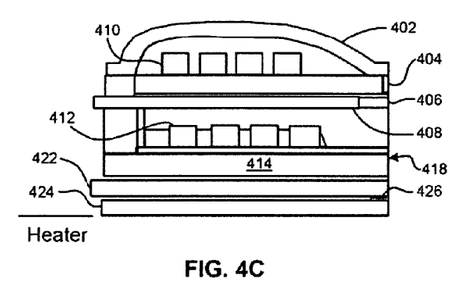
FIG. 4C is a cross-sectional view of one particular embodiment of a piggyback magnetic head with helical coils.

FIG. 4C illustrates a piggyback magnetic head having similar features to the head of FIG. 4A. Two shields 404, 414 flank the stitch pole 408 and main pole 406. Also sensor shields 422, 424 are shown. The sensor 426 is typically positioned between the sensor shields 422, 424.

Figure 4D:
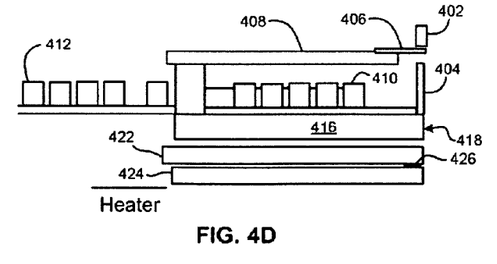
FIG. 4D is a cross-sectional view of one particular embodiment of a piggyback magnetic head with looped coils.

FIG. 4D illustrates another type of piggyback magnetic head having similar features to the head of FIG. 4B including a helical coil 410. Also, sensor shields 422, 424 are shown. The sensor 426 is typically positioned between the sensor shields 422, 424.

In FIGS. 4C and 4D, an optional heater is shown near the non-ABS side of the magnetic head. A heater (Heater) may also be included in the magnetic heads shown in FIGS. 4A and 4B. The position of this heater may vary based on design parameters such as where the protrusion is desired, coefficients of thermal expansion of the surrounding layers, etc.

Figure 5A:
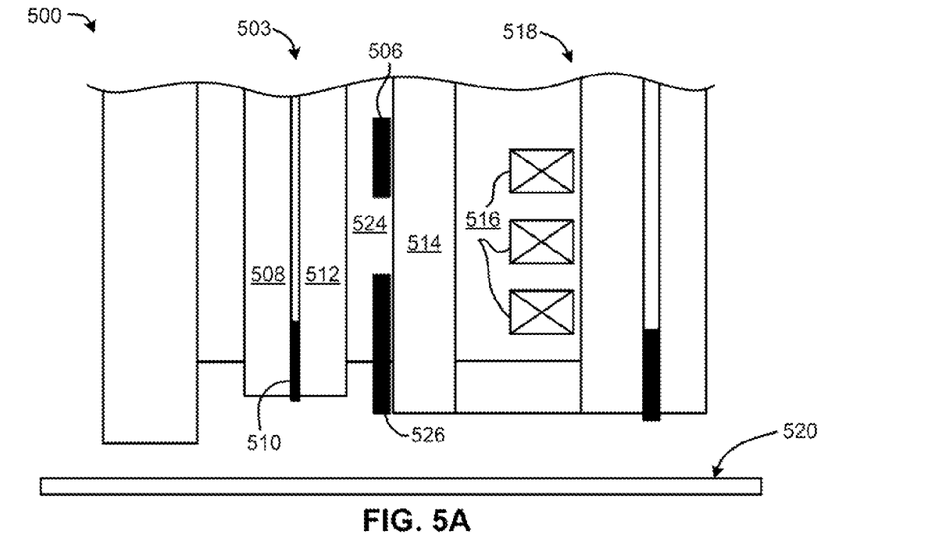
FIG. 5A shows a simplified schematic of a portion of a magnetic head prior to TFC heating according to one embodiment.
Figure 5B:
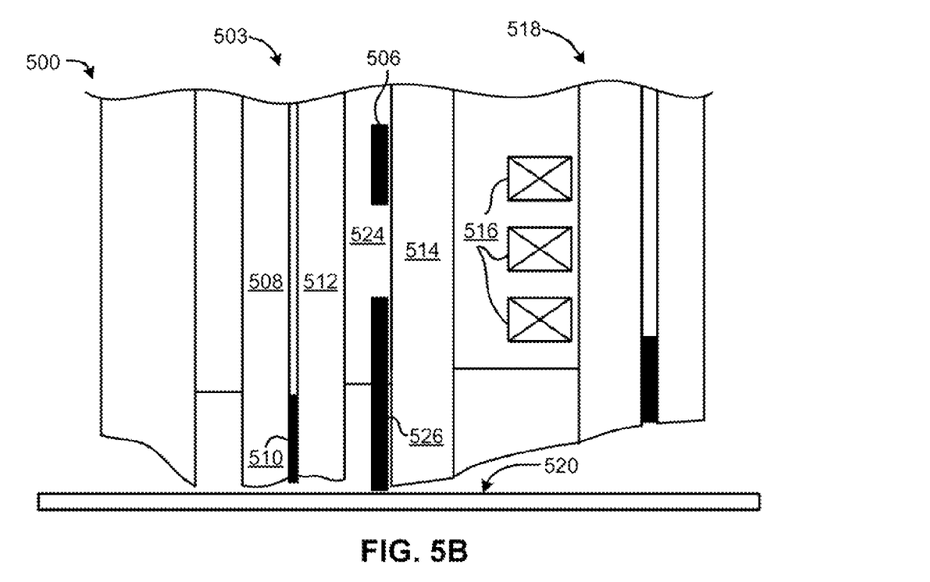
FIG. 5B shows a simplified schematic of a portion of a magnetic head after TFC heating in accordance with one embodiment.

FIGS. 5A and 5B illustrate partial cross sections of a head 500 according to certain embodiments. The head 500 shown in FIGS. 5A and 5B and the examples below may be formed by conventional processes and of conventional materials unless otherwise indicated.

In FIG. 5A, the head 500 may include a reader 503 having a sensor 510 and a writer 518. In addition, a lower shield layer (S1) 508 and an upper shield layer (S2) 512 may shield the sensor 510 from magnetic interference. A lower pole (P1) 514 may be included to deliver flux produced by coils 516 to the writer 518. Each of these elements may enable the head 500 to read and write information to a medium, such as a magnetic disk. Disk surface 520 is shown as an example of a surface that can be used for recording information from the magnetic head 500. A heating element or heater 506 may be included for inducing protrusion of elements of the head 500. Additional elements not described herein may be added, the heater 506 can be positioned at other locations, additional heaters 506 can be implemented, etc. FIG. 5A is an exemplary depiction of a portion of a magnetic head, and should not limit the invention in any manner, as any type of head may be used with this invention, including those described in FIGS. 2-4D.

The heat created by the heater 506 causes the head 500 to exhibit thermal effects. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials.

Thus, the heater 506 induces thermal expansion. When the heater 506 is energized, the surrounding materials are heated, causing them to attempt to expand according to their thermal expansion coefficients per unit power sent to the heater 506. The expansion results in protrusion of at least a portion of the ABS (the portion toward the disk surface 520) of the head 500. FIG. 5B is an illustrative diagram of what the head 500 may look like after thermal protrusion of the head elements.

By inducing controlled thermal expansion or the protrusion effect, this allows the head design to fly at a higher physical spacing thereby reducing any head-disk interface issues, while reducing read and/or write signal variations which would otherwise be caused by fly height variations. The advantage of heating the head on demand to cause a protrusion is that it affects the magnetic spacing of the head. This in turn allows the head to fly at a higher physical spacing when the heater is not energized, yet be in close proximity to the media during reading and/or writing. Thus, manufacturers can design the head so that the space between the ABS and disk media when the head is hot is known, allowing the designer to selectively set this spacing and obtain greater performance.

With continued reference to FIG. 5A, in order to accurately determine head-disk spacing without risking damage to the head 500 or disk 520, the head structure may incorporate a dedicated contact pad 526. This contact pad 526 may be located near the reader 503. The heater 506 location may be controlled so that head-disk contact can take place exclusively at this pad, either with the contact pad 526 itself, or with a coating applied to the contact pad 526. Further the contact pad 526 may be near the reader 503 and the recession at the reader 503 and the contact pad 526 may be so controlled that the reader 503 and/or writer 518 clearance from the disk 520 at the contact is less than a specified limit (e.g., less than about 2 nm, and in some approaches less than about 0.5 nm). The preferential contact at the contact pad 526 may also be ensured by choosing a material for the contact pad of slightly higher thermal expansion than that of the reader material.

The material of the contact pad 526 may be chosen so it does not damage the disk 520 and also so that if a carbon overcoat thereon gets worn off from its surface, it will not corrode.

This dedicated contact pad 526 may make the TFC contact calibration more deterministic and substantially eliminate the potential damage to the head 500 or the disk 520 during calibration and TFC touchdown.

In one particularly preferred embodiment, a magnetic head system includes a thin film stack having a magnetic transducer, such as a writer 518 and/or a reader 503 and a contact pad 526. In addition, a heater 506 in the thin film stack may be included for inducing thermal protrusion of a media-facing side (ABS facing) of the thin film stack, wherein the thin film stack is characterized by the contact pad 526 protruding farther than the magnetic transducer upon the thin film stack being heated by the heater 506 until head-disk contact is induced (as shown in FIG. 5B).

In one embodiment, the heater 506 may be positioned behind the contact pad 526 relative to the media facing side of the thin film stack, i.e., anywhere behind the contact pad 526; aligned with the contact pad 526 or not aligned. Further, the heater may lie in a plane of deposition of the contact pad 526.

In another embodiment, the transducer is a sensor 510, and the magnetic head system may further comprise a writer 518, wherein the contact pad 526 is positioned between the sensor 510 and the writer 518. Further, the contact pad 526 may be closer to a pole of the writer 518 than the sensor 510.

In yet another embodiment, the magnetic head system may further comprise a magnetic disk (such as disk 520), the transducer being for reading data from the disk or writing data to the disk.

In this or any other embodiment, the contact pad 526 may be constructed of a corrosion resistant material, such as nickel containing alloys or aluminum containing alloys.

In this embodiment or any other, the contact pad 526 may have a higher coefficient of thermal expansion than a thickest layer of the transducer which would likely be a layer of the reader 510 or a pole of a writer 518. For example, the coefficient of thermal expansion of the contact pad 526 may be between about 1% and about 50% higher, preferably between about 1% and about 15% higher, than the layer to which compared.

In another approach, the transducer may be a part of a reader, which may further comprise a magnetic shield, such as shield 508 or 512, wherein the contact pad 526 has a higher coefficient of thermal expansion than the shield.

In another preferred embodiment, a magnetic head system includes a thin film stack having a sensor 510, a writer 518, and a contact pad 526 positioned between the sensor 510 and the writer 518. In addition, a heater 506 in the thin film stack is included for inducing thermal protrusion of a media-facing side of the thin film stack, wherein the thin film stack is characterized by the contact pad 526 protruding farther than the magnetic transducer upon the thin film stack being heated by the heater 506 (as shown in FIG. 5B), wherein the heater 506 is positioned behind the contact pad 526 relative to the media-facing side of the thin film stack, i.e., anywhere behind the contact pad 526, aligned with it or not.

In a preferred embodiment, the heater 506 may be located between the P1 pole 514 and the writer 518. The heater 506 may generally be placed several microns away from the ABS. The contact pad 526 may also be placed directly below the heater 506 near the ABS.

Other suitable locations of the contact pad 526 and heater 506 will be obvious to those of ordinary skill in the relevant art.

Figure 6:
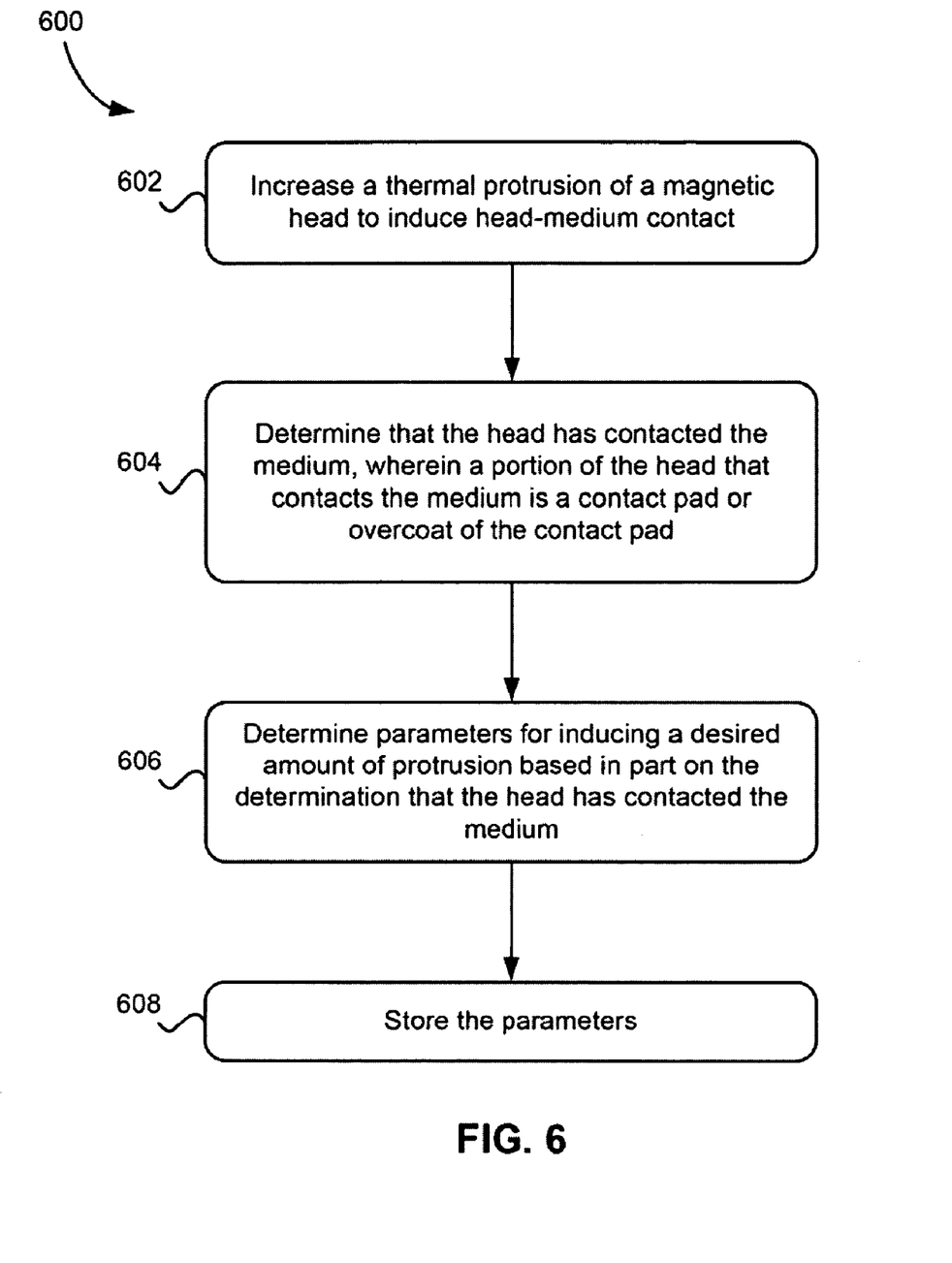
FIG. 6 shows a method in accordance with one embodiment.

In FIG. 6, a method 600 for calibrating a protrusion of a magnetic head is shown. The present method 600 may be used in the context of functionality of FIGS. 1-5B. In addition, the present method 600 may be used in any desired environment.

With continued reference to FIG. 6, in operation 602, a thermal protrusion of a magnetic head may be increased to induce head-medium contact. This contact may occur between the head and a magnetic disk, or some other medium capable of recording or carrying data.

In operation 604, it may be determined that the head has contacted the medium, wherein a portion of the head that contacts the medium is a contact pad or an overcoat of the contact pad. For example, the contact pad may be of a corrosion resistant material, with a coating material chosen so as not to harm the medium surface when contact is made. In addition, the contact pad may be of any material, while the contact pad overcoat is of a corrosion resistant material such that the contact pad material does not corrode. Any combination of these features is possible.

In operation 606, parameters for inducing a desired amount of protrusion may be determined, such as an amount of heat to apply to create a head protrusion of the desired spacing from the medium, etc., based in part on the determination that the head has contacted the medium such as the parameters used to cause the contact, a "zero" corresponding to the contact, etc.

In operation 608, the parameters determined in operation 606 may be stored, at least transiently, and preferably in a memory for future use. This memory may be part of the system controlling the head, or may be part of the computer system which utilizes the head system, such as a hard disk drive, etc.

In some embodiments, the contact pad may have no other function in the head except contacting the medium or causing the overcoat of the contact pad to contact the medium. Therefore, any damage sustained by the contact pad will not hinder or negatively affect operation of the rest of the components or parts of the head.

In some embodiments, contact may be only between the contact pad or overcoat of the contact pad and the medium, thus eliminating any possibility of other components becoming damaged from medium contact.

In some embodiments, the medium may be a magnetic disk. In addition, the system may further comprise applying the stored parameters for inducing about the desired amount of protrusion. For instance, the each time the system is calibrated, the stored parameters may be retrieved so that disk-medium contact does not have to be repeated, reducing the chance of damage to the disk or head components.

In some embodiments, the contact pad may be positioned near a reader of the head such that when the contact pad or overcoat of the contact pad contacts the medium, the reader and/or writer is less than about 2 nm from the medium, and in some approaches less than about 0.5 nm.

Figure 7:
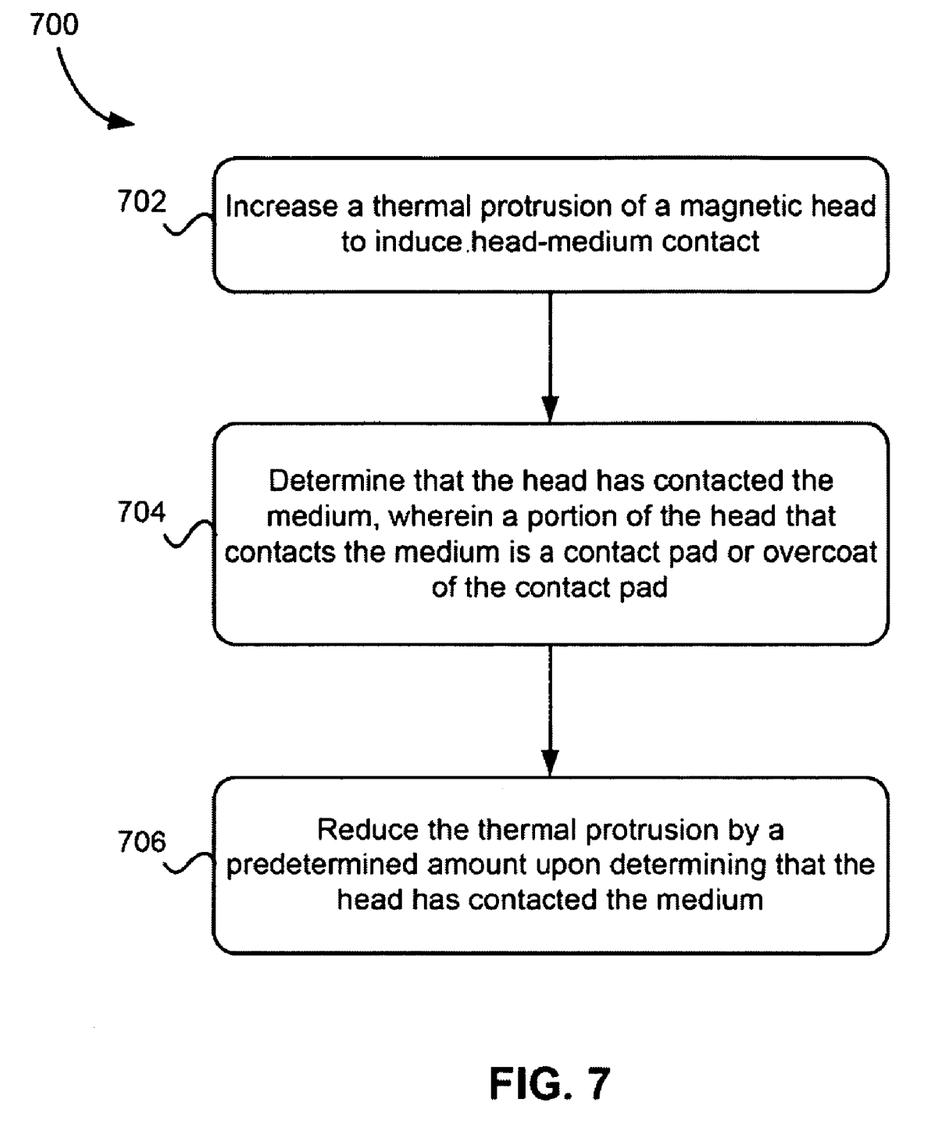
FIG. 7 shows a method in accordance with another embodiment.

In FIG. 7, a method 700 for calibrating a protrusion of a magnetic head is shown. The present method 700 may be used in the context of functionality of FIGS. 1-5B. In addition, the present method 700 may be used in any desired environment.

With continued reference to FIG. 7, in operation 702, a thermal protrusion of a magnetic head may be increased to induce head-medium contact. This contact may occur between the magnetic head and a magnetic disk, or any other medium capable of recording or carrying data.

In operation 704, it may be determined that the head has contacted the medium, wherein a portion of the head that contacts the medium is a contact pad or overcoat of the contact pad. For example, the contact pad may be of a corrosion resistant material, with a coating material chosen so as not to harm the medium surface when contact is made. In addition, the contact pad may be of any material, while the contact pad overcoat is of a corrosion resistant material such that the contact pad material does not corrode. Any combination of these features is possible.

In operation 706, the thermal protrusion may be reduced by a predetermined amount upon determining that the head has contacted the medium.

Method 700 may be carried out in light of the several embodiments discussed in accordance with method 600, or any suitable embodiments discussed in regard to FIGS. 1-5B.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A system, comprising:
a thin film stack having a magnetic transducer and a contact pad; and
a heater in the thin film stack for inducing thermal protrusion of a media-facing side of the thin film stack,
wherein the thin film stack is characterized by the contact pad protruding farther than the magnetic transducer upon the thin film stack being heated by the heater.
2. The system of claim 1, wherein an end of the heater positioned closest to the media-facing side is positioned behind an end of the contact pad farthest from the media facing side of the thin film stack.

3. The system of claim 1, wherein the heater lies in a plane of deposition of the contact pad.

4. The system of claim 1, wherein the transducer is a sensor, and further comprising a writer, wherein the contact pad is positioned between the sensor and the writer.

5. The system of claim 4, wherein the contact pad is closer to a pole of the writer than the sensor.

6. The system of claim 1, further comprising a magnetic disk, the transducer being for reading data from the disk or writing data to the disk.

7. The system of claim 1, wherein the contact pad is constructed of a corrosion resistant material.

8. The system of claim 1, wherein the contact pad has a higher coefficient of thermal expansion than a thickest layer of the transducer.

9. The system of claim 1, wherein the transducer is a sensor, and further comprising a magnetic shield, wherein the contact pad has a higher coefficient of thermal expansion than the shield.

10. A method for calibrating a protrusion of the magnetic head of claim 1, comprising: increasing a thermal protrusion of the magnetic head to induce head-medium contact; determining that the head has contacted the medium, wherein a portion of the head that contacts the medium is the contact pad or overcoat of the contact pad; determining parameters for inducing a desired amount of protrusion based in part on the determination that the head has contacted the medium; and storing the parameters.

11. The method of claim 10, wherein the contact pad has no other function in the head except contacting the medium or causing the overcoat of the contact pad to contact the medium.

12. The method of claim 10, wherein only the contact pad or overcoat of the contact pad contacts the medium.

13. The method of claim 10, further comprising applying the stored parameters for inducing about the desired amount of protrusion.

14. The method of claim 10, wherein the contact pad is positioned near a reader of the head such that when the contact pad or overcoat of the contact pad contacts the medium, the reader is less than about 2 nm from the medium.

15. The method of claim 10, wherein the contact pad is positioned near a writer of the head such that when the contact pad or overcoat of the contact pad contacts the medium, the writer is less than about 2 nm from the medium.

16. A method for calibrating a protrusion of the magnetic head of claim 1, comprising: increasing a thermal protrusion of the magnetic head to induce head-medium contact; determining that the head has contacted the medium, wherein a portion of the head that contacts the medium is the contact pad or overcoat of the contact pad; and reducing the thermal protrusion by a predetermined amount upon determining that the head has contacted the medium.

17. The method of claim 16, wherein the contact pad has no other function in the head except contacting the medium or causing the overcoat of the contact pad to contact the medium.

18. The method of claim 16, wherein only the contact pad or the overcoat of the contact pad contacts the medium.

19. The method of claim 16, wherein the contact pad is positioned near a reader of the head such that when the contact pad or the overcoat of the contact pad contacts the medium, the reader is less than about 2 nm from the medium.

20. The method of claim 16, wherein the contact pad is positioned near a writer of the head such that when the contact pad or overcoat of the contact pad contacts the medium, the writer is less than about 2 nm from the medium.

21. The system of claim 1, wherein the transducer is a writer, the contact pad being spaced from all poles of the writer.

22. The system of claim 1, wherein the contact pad has no other function in the head except contacting the medium or causing an overcoat of the contact pad to contact the medium.

23. A system, comprising:
a thin film stack having a sensor, a writer, and a contact pad positioned between the sensor and the writer; and
a heater in the thin film stack for inducing thermal protrusion of a media-facing side of the thin film stack,
wherein the thin film stack is characterized by the contact pad protruding farther than the magnetic transducer upon the thin film stack being heated by the heater,
wherein the heater is positioned behind the contact pad relative to the media-facing side of the thin film stack.

24. The system of claim 23, wherein the thin film stack includes a magnetic shield, wherein the contact pad has a higher coefficient of thermal expansion than the shield.

25. The system of claim 23, wherein the contact pad has a higher coefficient of thermal expansion than a pole of the writer.

* * * * *

UNITED STATES PATENT AND TRADEMARK OFFICE
CERTIFICATE OF CORRECTION

| | |
|---|---|
| PATENT NO. | : 8,149,541 B2 |
| APPLICATION NO. | : 12/253459 |
| DATED | : April 3, 2012 |
| INVENTOR(S) | : Baumgart et al. |

It is certified that error appears in the above-identified patent and that said Letters Patent is hereby corrected as shown below:

In the specification:

col. 3, line 1 replace "2F" with --2E--.

Signed and Sealed this
Twenty-sixth Day of June, 2012

David J. Kappos
*Director of the United States Patent and Trademark Office*